(12) United States Patent
Geppert et al.

(10) Patent No.: US 6,463,429 B1
(45) Date of Patent: Oct. 8, 2002

(54) SYSTEM AND METHOD FOR CONSISTENCY CONSTRAINT MANAGEMENT IN DATABASE MIDDLEWARE

(75) Inventors: Andreas Geppert, Zurich (CH); Edward Leo Wimmers, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,138

(22) Filed: Apr. 12, 2000

(51) Int. Cl.$^7$ ................................................ G06F 17/30
(52) U.S. Cl. .......................................... 707/3; 707/200
(58) Field of Search ................................ 707/3, 1, 2, 4, 707/5, 6, 7, 100, 102, 200, 104, 203

(56) References Cited

U.S. PATENT DOCUMENTS

| | | | |
|---|---|---|---|
| 4,933,848 A | 6/1990 | Haderle et al. | 364/300 |
| 4,947,320 A | 8/1990 | Crus et al. | 364/200 |
| 5,355,474 A | * 10/1994 | Thuraisngham et al. | 707/9 |
| 5,408,657 A | 4/1995 | Bigelow et al. | 395/600 |
| 5,551,029 A | 8/1996 | Jagadish et al. | 395/600 |
| 5,706,494 A | 1/1998 | Cochrane et al. | 395/602 |
| 5,745,890 A | 4/1998 | Burrows | 707/3 |
| 5,826,268 A | 10/1998 | Schaefer et al. | 707/9 |
| 5,890,154 A | 3/1999 | Hsiao et al. | 707/8 |
| 5,899,993 A | 5/1999 | Jenkins, Jr. | 707/9 |
| 6,189,010 B1 | * 2/2001 | Isip, Jr. | 707/100 |

OTHER PUBLICATIONS

Publication: Chawathe et al., "A Toolkit ofr Constraint Management in Heterogenous Information Systems", *Twelfth Int'l Conf. on Data Engineering*, New Orleans, Mar. 1996.

* cited by examiner

Primary Examiner—Sanjiv Shah
(74) Attorney, Agent, or Firm—John L. Rogitz

(57) ABSTRACT

A system and method for constraint management in a database middleware system that responds to queries for data from requesting user applications by accessing diverse data sources. A constraint manager receives notifications of updates from sources that support notification, and the constraint manager monitors other sources that support monitoring, to undertake constraint management. Repairs of inconsistencies are made when possible, and when repairs are not possible, the inconsistencies are nulled out if the inconsistencies are totally useless to the requesting user application. In contrast, if the requesting application has some use for otherwise inconsistent, unrepairable data, the data is sent to the application along with an alert of the inconsistencies. Also, for those sources that do not support either notification or monitoring, the constraint manager executes just-in-time checking, i.e., when a query is received, the constraint manager checks data that is to be accessed pursuant to the query, and if inconsistencies are found, the inconsistencies are virtually repaired, i.e., data received from the source is repaired at the constraint manager. The query is then executed against the repaired data.

10 Claims, 3 Drawing Sheets

JUST IN TIME
CHECKING

SYSTEM AND METHOD FOR CONSISTENCY CONSTRAINT MANAGEMENT IN DATABASE MIDDLEWARE

BACKGROUND OF THE INVENTION

1. Field of the Invention

The present invention relates generally to systems and methods for managing consistency constraints in database middleware that interfaces with a variety of data sources.

2. Description of the Related Art

Consistency constraints are implemented in database systems to ensure that the stored data is "correct" with respect to the real world reflected by the data, such that applications and users of the data are shielded from incorrect data. For example, a database constraint might be that an employee cannot be paid more than the employee's manager, and any attempt to enter into the database a salary for the employee that is higher than the salary of the employee's manager would be forbidden by the database constraint manager by, e.g., aborting the transaction that caused the constraint violation.

Moreover, when a database system includes plural data sources, constraints might exist for ensuring that the data in the sources is consistent across the sources. To support consistency constraint management, the sources might notify a constraint manager every time an update has taken place, so that the constraint manager can access the source and check the new data for consistency. If a violation occurs, the constraint manager typically has authority to write a correction to the affected source, to remedy the constraint violation. Or, the constraint manager might from time to time monitor the sources for constraint violations by evaluating an entire data source for consistency on a periodic basis.

In any case, the present invention makes the critical observation that in the case of database middleware, i.e., systems that respond to external user-generated queries for information by accessing multiple data sources, the middleware might access many diverse types of data sources. Some of the sources might notify the middleware of updates, some might permit the middleware to only monitor the sources for updates, and some sources (e.g., Internet-based sources) might not support either notification or monitoring and in any case might not grant middleware the privilege to repair inconsistencies at all, even when the inconsistencies are identified, thus depriving the middleware of the authority to enforce constraints at the source level. The present invention makes the further critical observation that partially inconsistent data might nonetheless be useful to an application, as when, for example, residence data violating a zip code constraint but nonetheless properly listing telephone numbers is supplied to a telemarketer. Accordingly, the problem addressed by the present invention is how to manage consistency constraints in middleware that uses various types of data sources to respond to queries from various different users/applications, some of which might have constraint compliance requirements that are different than other users/applications.

SUMMARY OF THE INVENTION

A general purpose computer is programmed according to the inventive steps herein to manage consistency constraints. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including a general purpose computer and a query processor. Plural data sources are accessible to the computer such that the query processor can retrieve data from the sources in response to a user query, and logic is provided that is executable by the computer for undertaking method acts to determine whether a source generates notifications of data updates, and if so, receiving the notifications. The logic also includes determining whether the source permits monitoring of updates and whether monitoring is feasible, and if the source permits monitoring of updates and monitoring is feasible, the logic monitors for updates from the source. Otherwise, the logic envisions undertaking just in time checking for consistency, with the just in time checking including receiving a query from the query processor and checking for constraint consistency, prior to executing the query to return a query result.

In a preferred implementation, the virtual repair logic includes repairing inconsistencies in data received from the source after receiving the data from the source to render repaired data. Moreover, the preferred logic further includes sending the repaired data to the query processor, such that the query is executed by the query processor using repaired data instead of inconsistencies.

As set forth further below, the preferred logic includes identifying at least one data inconsistency during at least one of: the act of receiving the notifications, and the act of monitoring for updates from the source. Then, it is determined whether a repair is known for the inconsistency, and if so, whether a write interface to the data source of the inconsistency is provided. Also, it is determined whether authority to update the data source of the inconsistency has been granted, and if so, the inconsistency is repaired at the data source.

In contrast, if it is determined that a repair is not known for the inconsistency, the logic includes determining whether marking is requested, and if so, marking the inconsistency in the query result. Otherwise, the logic envisions nulling out the inconsistency or sending an alert with respect to the inconsistency to a user generating the query. The act of nulling out or alerting includes determining whether to null out or alert based on at least one of: the inconsistency, and the user. Thus, for example, an inconsistent zip code in a residence record containing a telephone number can be nulled out for a telemarketer requiring only a correct telephone number, whereas an alert of an inconsistent zip code can be sent to a direct mailer user requiring the same record.

In another aspect, a computer-implemented method for constraint management in a database middleware system includes accessing at least one data source supporting neither update notification nor monitoring by the middleware system. The method includes receiving a query requiring accessing of the data source, and checking for constraint consistency of data from the data source after receiving the query and prior to executing the query to return a query result.

In still another aspect, a computer program device includes a computer program storage device readable by a digital processing apparatus and a program on the program storage device and including instructions executable by the digital processing apparatus. The instructions include code means for receiving a query for data, and code means for communicating with a data source in response to the query. Code means check for data constraint inconsistencies in data stored at the data source, prior to executing the query. Also, code means repair any inconsistencies at a location other than the data source, and code means execute the query, after inconsistencies have been repaired.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
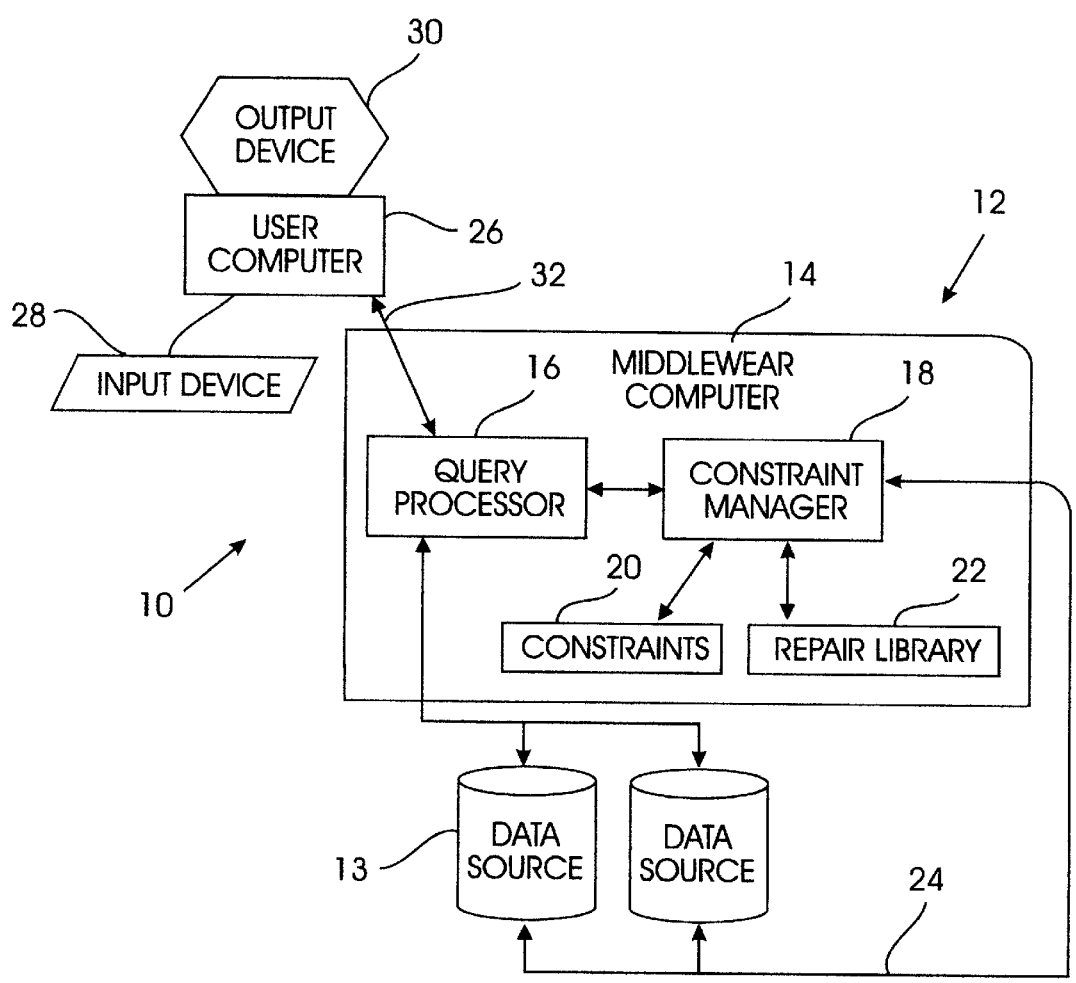
FIG. 1 is a schematic diagram showing the system of the present invention.

Referring initially to FIG. 1, a system is shown generally designated 10, for managing consistency constraints in a database middleware system 12. As an example of a constraint, a zip code in a record might be checked against another attribute in the record, e.g., a street address or telephone area code, to ascertain whether the attributes satisfy a constraint that they are internally consistent with each other. The principles herein also can be applied to, e.g., real estate transactions, where a constraint might exist that clients have a credit report from a credit bureau, or to drug development, where constraints might exist that new drugs have passed certain tests. Yet again, an employer might have the constraint that records in the human resources department agree with records in an employee's department regarding the identity of the employee's manager. Also, a company might require the data constraint that sales information is consistent with inventory reports, and so on.

In any case, the data may reside, for example, in plural data sources 13 that are of different types from each other. In the particular architecture shown, the system 10 includes a digital processing apparatus, such as a middleware computer 14. In one intended embodiment, the middleware computer 14 may be a mainframe middleware computer made by International Business Machines Corporation (IBM) of Armonk, N.Y., or the middleware computer 14 may be any computer, including computers sold under trademarks such as AS400, with accompanying IBM Network Stations. Or, the middleware computer 14 may be a Unix computer, or OS/2 server, or Windows NT server, or IBM RS/6000 250 workstation or an IBM laptop computer or personal computer.

As shown in FIG. 1, the middleware computer 14 includes a conventional query processor 16 that communicates with the data sources 13 and with a constraint manager 18 which functions in accordance with the disclosure below. The constraint manager 18 accesses a list 20 of constraints and a library 22 of data repairs for inconsistencies. Also, the constraint manager 18 communicates with the data sources 13 as shown by the line 24 to ensure that data from the sources 13 that is returned to the query processor 16 is consistent with relevant constraints in the list 20 of constraints, or if inconsistent, is repaired using repair operations from the library 22, or if not repaired is nulled out, marked, or otherwise indicated as being inconsistent.

Accordingly, a user (including a human user or a software-implemented application user) can, by means of a user computer 26 having an associated input device 28 and an output device 30, generate a query for data and send this request to the query processor 16 via a communication path 32. The path 32 can be a wired or wireless local area network (LAN), or a wide area network (WAN) such as the Internet or an Intranet, or indeed the path 32 can be an internal data bus of the middleware computer 14, in which case the user computer 26 would be integral to the middleware computer 14. In any case, the user computer 26 can be any one of the above-mentioned computers. Further, the input device 28 can include one or more of: a mouse, a keyboard, a keypad, a voice recognition device, a trackball, a joystick, and so on. Also, the output device 30 can be one or more of: a printer, or monitor, or other computer.

The flow charts herein illustrate the structure of the constraint manager 18 of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the constraint manager 18 may be a computer program that is executed by a processor within the middleware computer 14 as a series of computer-executable instructions. In addition to hard drives of the computer 14, these instructions may reside, for example, in RAM of the middleware computer 14, or the instructions may be stored on a DASD array, magnetic tape, electronic read-only memory, or other appropriate data storage device. In an illustrative embodiment of the invention, the computer-executable instructions may be lines of compiled $C^{+-}$compatible code.

Figure 2:
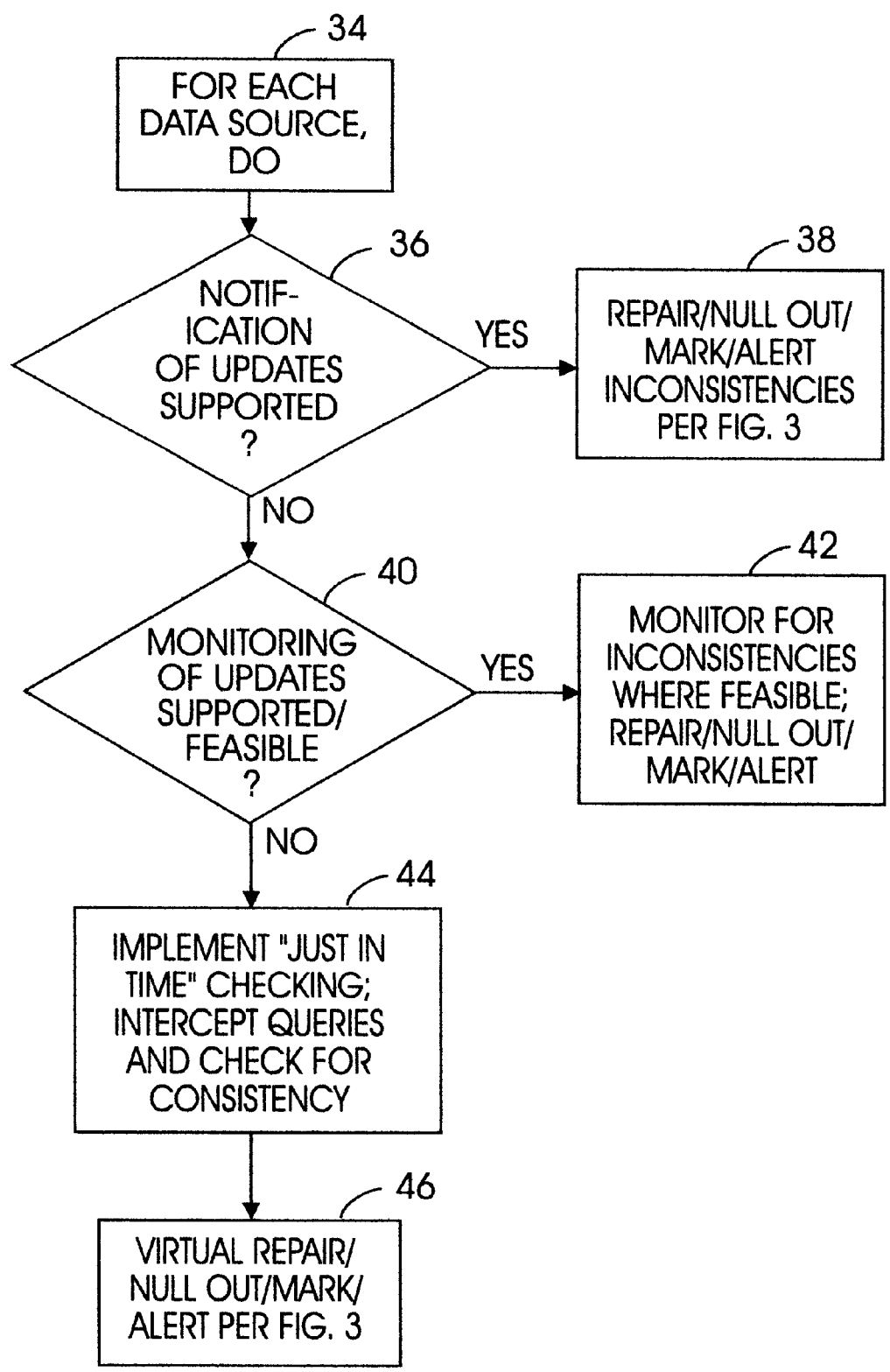
FIG. 2 is a flow chart showing the logic for determining which type of consistency management to undertake for a data source.
Figure 3:
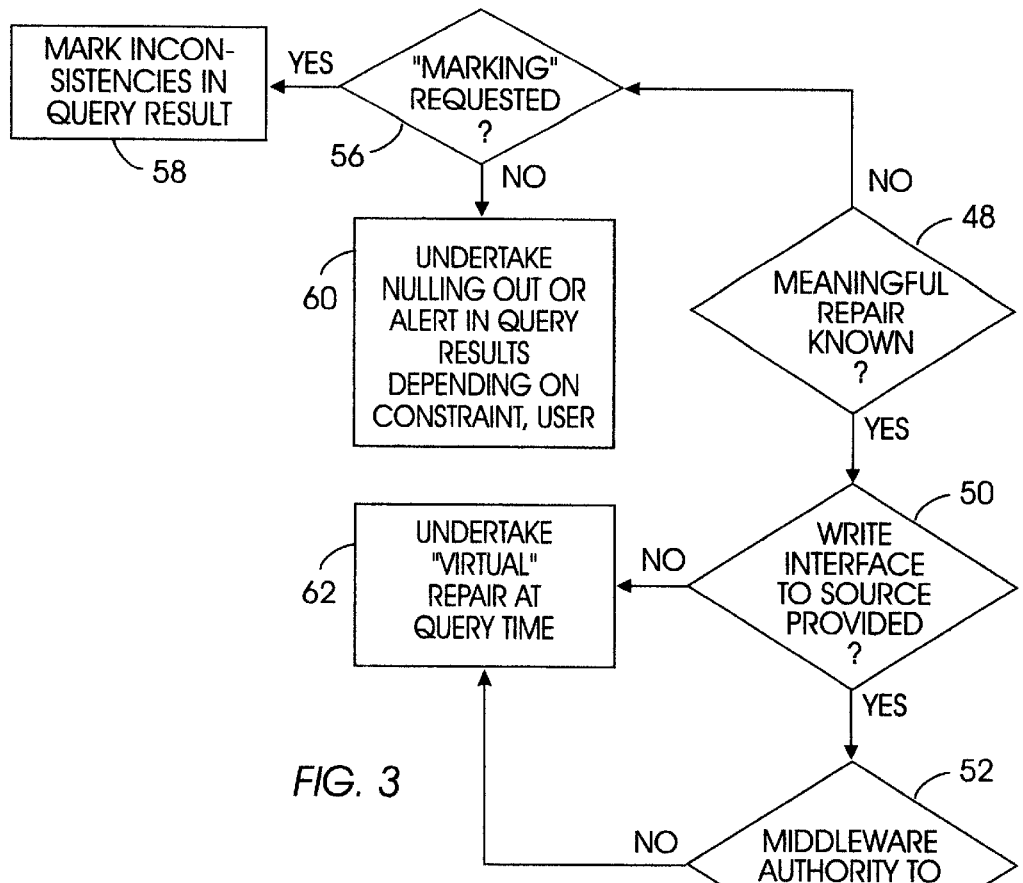
FIG. 3 is a flow chart showing the logic for determining what type of consistency violation corrective action to take.
Figure 4:
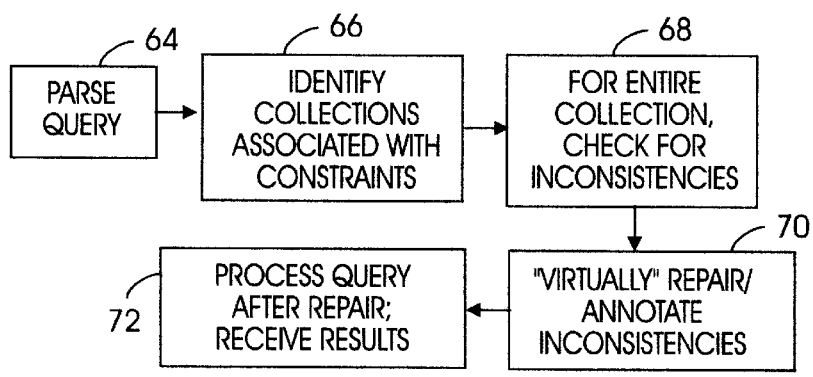
FIG. 4 is a flow chart showing further details of the logic for just-in-time constraint checking and virtual repair of constraint violations.

The logic of the present invention can be seen in reference to FIGS. 2–4. As intended by the present invention, the following terms have the indicated meanings. "Notification-based checking" means that a data source 13 informs the middleware computer 14 about updates to its local data, and the constraint manager 18 then checks for violations of those constraints which apply to the updated data. The notification can be performed by a data source using triggers such as are used in some relational database systems, or by using a built-in mechanism of a database management system, or by using event services that are supported by some data sources such as the CORBA common object system. The notification is then used by the constraint manager 18 to precisely determine what records must be checked for constraint violations.

"Constraint monitoring", on the other hand, means that the middleware computer 14 checks for constraint violations (resulting in "inconsistencies") at regular intervals at those data sources 13 that support monitoring, either by issuing queries to the sources involved in a constraint or by retrieving information about updates from update logs in data sources 13 that keep such logs. For each updated record that is logged, the constraints are checked. This last method of monitoring is also referred to as "polling".

Moreover, "just in time" checking means that the middleware computer 14 checks for constraints as data is requested by queries to sources 13 that do not support notification or monitoring. That is, constraint checking is undertaken whenever queries against constrained data are submitted to the query processor 16.

With respect to corrective action that is taken in response to a noted inconsistency "repair" means that a constraint violation is remedied by writing an update request to the data source 13 storing the inconsistency to correct the inconsistency. "Nulling out" means replacing inconsistent data in query results with null values, with no action being undertaken at the data source 13 storing the inconsistency. "Alerting" means that alerts are sent to a responsible party, e.g., the user or system manager by, for example, email, that an inconsistency has not been repaired or nulled out but has nonetheless been returned as a query result to a user. "Marking" means annotating inconsistent query results with information pertaining to the relevant constraint violation, preferably after the manner of a normal select-expression. "Virtual repair" means repairing inconsistent data from a data source 13, but not at the data source if, for instance, the data source does not permit the middleware computer 14 to write to the source. Instead, the repairs are executed at a location other than the source, e.g., at the middleware computer 14, as data is received from a source 13 pursuant to a query, provided the middleware computer 14 has information pertaining to how to correctly repair the data. Accordingly, virtual repair does not require write access to data sources 13.

With the above in mind, reference is now made to FIG. 2. Commencing at block 34, a DO loop for each data source 13 is entered. Proceeding to decision diamond 36, it is determined for the source whether the source supports notifications of updates, i.e., whether the source notifies the middleware computer 14 of updates. If so, the logic moves to block 38 to receive notifications and to repair, or null out, or mark, or issue alerts regarding inconsistencies, depending on the results of the logic shown in FIG. 3.

In contrast, when it is determined at decision diamond 36 that the data source under test does not notice updates, the logic flows to decision diamond 40 to determine whether the source supports monitoring, and whether monitoring is feasible, e.g., whether the size of the data source under test is less than a predetermined size. This last determination preferably is made because, as recognized herein, monitoring can require checking an entire collection of data periodically for constraint violations, and this might not be feasible in the case of relatively large data sources 13. When monitoring is both supported and feasible, the logic moved from decision diamond 40 to block 42 to monitor for inconsistencies and to undertake one or more of the corrective actions in the event of inconsistencies as set forth further below in reference to FIG. 3.

As provided for herein, when neither notification nor monitoring is supported by a data source, the logic moves to block 44 to implement the above-defined just in time checking for inconsistencies. As a query is parsed by the query processor 16, constraints are checked on the data being queried, such that only consistent results are returned to the user, or inconsistent results, if returned, are indicated as such by marking or alerting or are nulled out at block 46.

FIG. 3 shows the logic for selecting a remedy for a detected inconsistency. Commencing at decision diamond 48, it is determined whether a meaningful repair to the inconsistency is known. For instance, a salary field might indicate too high a salary, but the middleware computer 14 might have knowledge of the correct salary from another data source or programmatically. Or, a zip code field might contain an incorrect or null zip code for a person, and the middleware computer might know the correct zip code from an alternate source.

If a meaningful repair is known, the logic moves to decision diamond 50 to determine whether a write interface to the source of the inconsistency has been provided to the middleware computer 14. If it has, the logic continues to decision diamond 52 to determine whether the middleware computer 14 has the authority to update the data source 13 of the inconsistency. If all three tests are positive, the inconsistency is repaired at the data source at block 54 for notification-based and monitoring-based sources 13.

As an example, suppose an inconsistency is uncovered wherein in a single residence record, a zip code is listed as an attribute that cannot possibly pertain to the accompanying street address. A repair for this inconsistency can be expressed as reaction repairAddr(this), which could, for example, define a function that examines a zip code listing to find the nearest possible address in that zip code and to replace the address attribute of the record with the nearest possible address. Alternatively, a replacement zip code can be defined that matches the address attribute, and the inconsistent zip code replaced with the replacement zip code.

If, on the other hand, it is determined at decision diamond 48 that a meaningful repair is not known, the logic can flow to decision diamond 56 to determine whether the query processor 16 or querying user has requested that inconsistencies be marked in the query result. As understood herein, marking inconsistencies in query results can require significant modifications to the query processor 16, even though marking does not require the introduction of new flags and therefore does not affect the way the processor 16 processes queries. If marking is requested, the logic flows to block 58 to mark inconsistencies as such in the returned query results. An example of a marking semantic might be "reaction mark", in which case the user can request an inconsistency mark as part of the query result using select p.street, mark (p.oid,CorrectAddress) from persons p, again using, as an example, an inconsistent address.

In contrast, if marking is not requested, the logic can flow from decision diamond 56 to block 60 to null out inconsistent results, or to alert a user by means external to the query result (e.g., by email) of the inconsistencies. Nulling out can be undertaken, for example if an inconsistent zip code has been detected, using NULLout this.ZipCode. Altering can be undertaken by using, e.g., reaction alert user, which can cause an email to be sent to a user regarding the inconsistency.

In any case, the activity undertaken at states 56–60 can depend on the user and on the constraint being violated. For instance, nulling out might be associated with some constraint violations, whereas alerting might be associated with other constraint violations, and both of these associations can be defined by the particular user generating the query.

When a meaningful is repair is known but no write interface or write authority has been granted to repair an inconsistency at the data source, the logic can flow from decision diamond 50 or 52 to block 62, wherein the above-defined virtual repair is undertaken at query time. In virtual repair, it is preferable that one repair be provided for each inconsistent attribute. Again using an inconsistent zip code as an example, the semantics for a virtual repair might be reaction replace ZipCode by this,ZipRepair( ), which could be executed by int ZipRepair( ).

FIG. 4 shows the details of the above-defined just in time checking. Commencing at block 64, the query processor 16 parses a query from a user. Moving to block 66, data collections in the data sources 13 are identified that pertain to the query, and these collections are associated with appropriate constraints. Then, at block 68, for the entire collection, the constraint manager 18 checks for inconsistencies, with the inconsistencies being virtually repaired at a location other than the data sources 13 (e.g., at the middleware computer 14) or otherwise annotated as being inconsistent at block 70. The query is processed at block 72 after repairs/annotations, with the correct results being displayed to the user or with inconsistent results being marked or the user otherwise alerted to them as set forth above.

While the particular SYSTEM AND METHOD FOR CONSISTENCY CONSTRAINT MANAGENIENT IN DATABASE MIDDLEWARE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:
    a query processor;
    plural data sources accessible to the query processor such that the query processor can retrieve data from the sources in response to a user query; and
    a constraint manager embodying logic for undertaking method acts comprising:
        for at least one data source, determining whether the source generates notifications of data updates, and if so, receiving the notifications;
        determining whether at least one source permits monitoring of updates, and if so, monitoring for updates from at least one source; and
        undertaking just in time checking for consistency for at least some sources that do not generate notifications or permit monitoring, the just in time checking including receiving a query from the query processor and based thereon checking for constraint consistency, prior to executing the query to return a query result.

2. The system of claim 1, wherein the method acts undertaken by the logic further include:
    checking for constraint consistency to identify inconsistencies; and
    repairing inconsistencies in data received from the source after receiving the data from the source to render repaired data.

3. The system of claim 2, wherein the method acts undertaken by the logic further include sending the repaired data to the query processor, such that the query is executed by the query processor using repaired data instead of inconsistencies.

4. The system of claim 1, wherein the method acts undertaken by the logic further include:
    identifying at least one data inconsistency during at least one of: the act of receiving the notifications, and the act of monitoring for updates from the source;
    determining whether a repair is known for the inconsistency, and if so: determining whether a write interface to the data source of the inconsistency is provided, and if so, determining whether the manager has authority to update the data source of the inconsistency, and if so, repairing the inconsistency at the data source.

5. The system of claim 4, wherein the method acts undertaken by the logic further include, if it is determined that a repair is not known for the inconsistency, determining whether marking is requested, and if so, marking the inconsistency in the query result, and otherwise nulling out the inconsistency or sending an alert with respect to the inconsistency to a user generating the query.

6. The system of claim 5, wherein the method acts undertaken by the logic further include, if a write interface to the data source of the inconsistency is not provided or if the manager does not have authority to update the data source of the inconsistency, repairing inconsistencies in data received from the source after receiving the data from the source to render repaired data.

7. The system of claim 5, wherein the act of nulling out or alerting includes determining whether to null out or alert based on at least one of: the inconsistency, and the user.

8. A computer program device comprising:
    a computer program storage device readable by a digital processing apparatus; and
    a program on the program storage device and including instructions executable by the digital processing apparatus, the instructions including:
        computer readable code means for receiving a query for data;
        computer readable code means for communicating with a data source in response to the query;
        computer readable code means for checking for data constraint inconsistencies in data stored at the data source, prior to executing the query, the means for checking including:
            means for, for at least one data source, determining whether the source generates notifications of data updates, and if so, receiving the notifications; otherwise invoking
            means for determining whether the source permits monitoring of updates and whether monitoring is feasible, and if the source permits monitoring of updates and monitoring is feasible;
        monitoring for updates from the source otherwise invoking
            means for undertaking just in time checking for consistency, the just in time checking including receiving a query from a query processor and checking for constraint consistency, prior to executing the query to return a query result.

9. The device of claim 8, further comprising:

computer readable code means for repairing ant inconsistencies at a location other than the data source; and computer readable code means for executing the query, after inconsistencies have been repaired.

10. The device of claim 9, further comprising:

computer readable code means for sending repaired data to the query processor, such that the query is executed by the query processor using repaired data instead of inconsistencies.

* * * * *